No. 764,063. PATENTED JULY 5, 1904.
H. B. MAXWELL.
DRIVING MECHANISM FOR AUTOMOBILES.
APPLICATION FILED APR. 16, 1904.
NO MODEL.

WITNESSES
Daniel M. Hall
Anna Mae Tooker.

INVENTOR
Harry B. Maxwell

No. 764,063.

Patented July 5, 1904.

UNITED STATES PATENT OFFICE.

HARRY B. MAXWELL, OF ROME, NEW YORK, ASSIGNOR, BY DIRECT AND MESNE ASSIGNMENTS, TO THE MAXWELL & FITCH COMPANY, OF ROME, NEW YORK, A CORPORATION.

DRIVING MECHANISM FOR AUTOMOBILES.

SPECIFICATION forming part of Letters Patent No. 764,063, dated July 5, 1904.

Application filed April 16, 1904. Serial No. 203,461. (No model.)

*To all whom it may concern:*

Be it known that I, HARRY B. MAXWELL, of Rome, in the county of Oneida and State of New York, have invented certain new and useful Improvements in Driving Mechanism for Automobiles; and I do hereby declare that the following is a full, clear, and exact description of the invention, which will enable others skilled in the art to which it appertains to make and use the same, reference being had to the accompanying drawings, and to the letters of reference marked thereon, which form part of this specification.

The object of my present invention is to provide an improved driving mechanism for automobiles, whereby more particularly an engine running at substantially constant speed, like a gasolene or explosive engine, may be utilized to drive the automobile at different rates of speed and in different directions.

Figure 1:
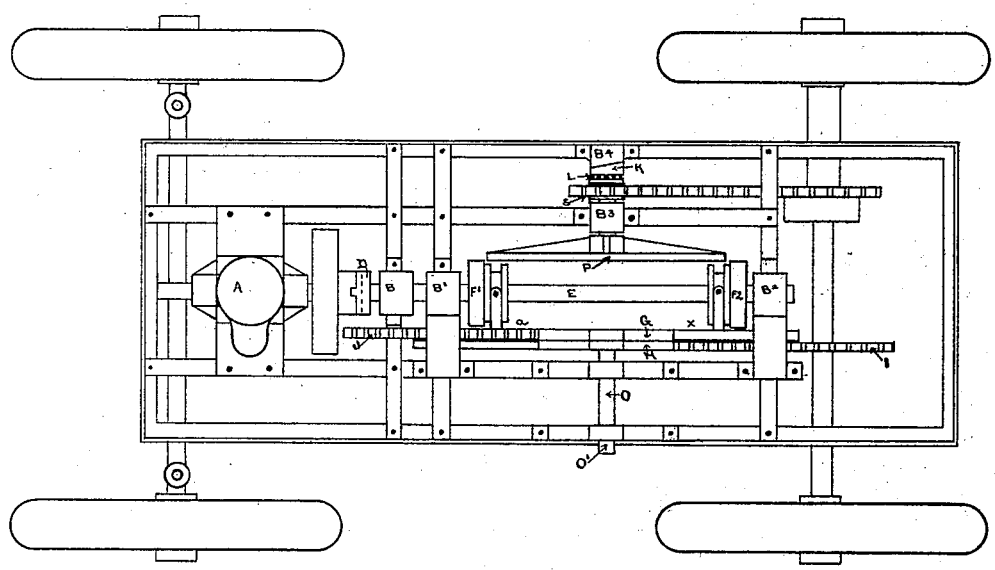
Figure 2:
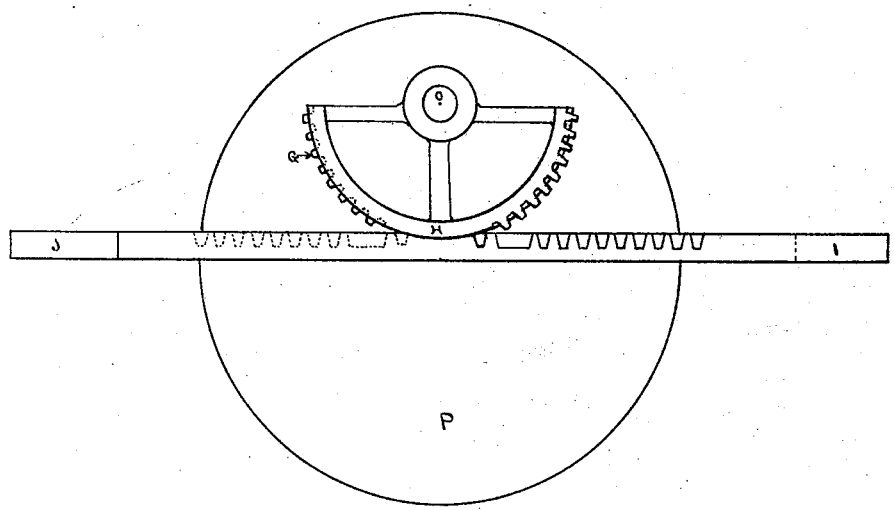

In the drawings, Figure 1 shows a plan view of the framework of an automobile with my improved mechanism mounted thereon. Fig. 2 shows in side elevation details of mechanism for controlling the device.

Referring to the reference-letters in a more particular description, A indicates the motor. The motor is adapted to be connected to the main driving-shaft E by means of a flexible coupling D. The shaft E is mounted in bearings B, B', and B². Mounted on the shaft E to rotate therewith are two friction-wheels F' and F². These two friction-wheels are adapted to slide toward and from each other and are provided with mechanism for independently operating them, as hereinafter specified. Opposite to the shaft E and extending in a plane parallel therewith is the friction-disk P, which has a plane plate-like face adapted to be engaged by either of the wheels or rolls F' or F². The disk P is mounted in bearings B³ B⁴ on a short shaft which extends from the disk through these two bearings. Secured on the shaft is a sprocket-wheel S, which is connected by the sprocket-chain M with the driving-sprocket N, situated on the axle of the automobile. For adjusting the disk P toward and from the rollers F' and F² there is provided an inclined collar K, which, in combination with the inclined end on the bearing B⁴, serves to effect this adjustment. Between the collar K and the side of the sprocket S there may be introduced bearing-balls L, which will reduce the friction incident to the thrust. For sliding the friction wheel or roller F' along the shaft E there is provided a rack-bar J, which is connected to the hub of the wheel F' by means of a forked arm *a*. For operating the friction-wheel F² along the shaft E there is provided a rack-bar I, which is connected to the hub of friction-wheel F² by a forked arm X.

Secured on the inner end of shaft O, which is mounted in bearings in the frame, are two sectors G and H. The former is provided with a number of teeth on one portion of its periphery adapted to engage with the teeth of rack-bar J. The sector H is provided with a series of teeth adapted to engage with the teeth of rack-bar I. The relative arrangement of the sectors with their teeth and the teeth of the rack-bars is shown in Fig. 2. To the end of the shaft O at the point indicated by O' there may be applied a lever or handle by means of which the sectors G and H may be operated.

When the friction-wheels F' and F² are out of engagement with the face of the disk P, as shown in Fig. 1, the engine or motor and shaft E may be running without transmitting the motion to the wheels and running-gear of the automobile. When it is desired to transmit the power to the running-gear, one or the other of the friction-wheels F' or F² is brought into contact with the face of the disk P. To do this, the operator moves the handle on the shaft O in one direction or the other, as circumstances may require, depending on whether the automobile is to move forwardly or backwardly. It will be noted that when the face of the friction-disk F' or F² comes into engagement with the disk P the disk P will be driven and the motion transmitted to the running-gear. When the friction-wheels are in engagement with the periphery of the disk P, the speed of the automobile will be comparatively slow, while when the friction-wheel is moved along the shaft E far enough to bring it near the center of the face of the disk P the speed of the automobile will be greatly accelerated. Ordinarily the friction-wheels F' or F² will not be moved into engagement with the disk P except when the same are under motion, being driven by the engine or motor.

It is evident that a great variety of speeds may be secured by this construction of driving mechanism and that the application of the power to the running-gear may be very quickly disconnected and applied in the reverse direction in case of emergency.

It is evident that various modifications of the device herein shown and described may be made without departing from the spirit of my invention.

What I claim as new, and desire to secure by Letters Patent, is—

1. The combination with a constantly-driven shaft, of a pair of friction-wheels mounted thereon and movable independently toward and from each other along the shaft, a disk supported in a plane parallel with that of the shaft and a shaft on which the disk is mounted to rotate, and means for moving the said friction-wheels along the shaft from a point approximately at the center of the disk to a point beyond its periphery, substantially as set forth.

2. In a driving mechanism of the character described, the combination of a rotatable disk in the nature of a face-plate, a shaft extending diametrically across the face of the disk at a sufficient distance therefrom, a pair of friction-wheels mounted on said shaft, and longitudinally movable thereon from a point beyond the periphery of the disk to a point approximate to the axial line of the disk, substantially as set forth.

3. The combination in a driving mechanism of the character described, of the driven shaft E, the friction-wheels F' and F² mounted thereon and laterally movable thereon, the driven disk P, in the nature of a face-plate, supported in a plane approximate to the shaft E and parallel therewith, and means for independently moving the friction-wheels F' and F² laterally along the shaft E, consisting of rack-bars connected to the friction-wheels F' and F² respectively, and toothed segments adapted to engage with the rack-bars and operate them respectively, substantially as set forth.

In witness whereof I have affixed my signature, in presence of two witnesses, this 11th day of April, 1904.

HARRY B. MAXWELL.

Witnesses:
Q. H. BETSINGER,
A. K. HAYNES.